Aug. 8, 1967    H. W. KAATZ    3,334,658
SELECTOR VALVE

Filed March 4, 1964    4 Sheets-Sheet 1

INVENTOR.
HERBERT W. KAATZ
BY Bosworth, Sessions
Herostrom & Knowles
ATTORNEYS.

Aug. 8, 1967  H. W. KAATZ  3,334,658
SELECTOR VALVE

Filed March 4, 1964  4 Sheets-Sheet 2

INVENTOR.
HERBERT W. KAATZ
BY Bosworth, Sessions,
Herrshoun & Kaoula
ATTORNEYS.

Aug. 8, 1967     H. W. KAATZ     3,334,658
SELECTOR VALVE

Filed March 4, 1964     4 Sheets-Sheet 3

INVENTOR.
HERBERT W. KAATZ
BY Bosworth Sessions
Herrshou & Knowles
ATTORNEYS.

Aug. 8, 1967     H. W. KAATZ     3,334,658
SELECTOR VALVE

Filed March 4, 1964     4 Sheets-Sheet 4

INVENTOR.
HERBERT W. KAATZ
BY
ATTORNEYS.

United States Patent Office 3,334,658
Patented Aug. 8, 1967

3,334,658
SELECTOR VALVE
Herbert W. Kaatz, Elyria, Ohio, assignor to Randolph
Mfg. Co., Cleveland, Ohio, a corporation of Ohio
Filed Mar. 4, 1964, Ser. No. 349,377
12 Claims. (Cl. 137—630.16)

This invention relates to multi-port valves and particularly to a valve for selectively connecting and disconnecting a plurality of ports to and from each other and/or for selectively connecting and disconnecting one or more of a plurality of inlet ports to and from a common outlet port.

Multi-port valves embodying my invention can be used with especial advantage in aircraft fuel systems. A common outlet port of the valve is connected to a fuel-consuming engine. A plurality of inlet ports are connected to various fuel tanks and perhaps the fuel systems of other engines on multi-engine aircraft to permit supplying the needs of the engine from selected supply tanks and/or for the cross-feeding of fuel between the supply systems associated with two or more engines.

Since the engines and/or the fuel tanks in an aircraft are most frequently located away from or at least not closely adjacent to the pilot's location or cockpit and, further, because of various safety considerations, it is often necessary and/or desirable to install the selector valves in the fuel system at some distance from the pilot. Under such circumstances, means must be provided closely adjacent the pilot for operating the valves. Whether the valves are located remotely from or closely adjacent to the pilot, they must be able to be operated easily, positively and, preferably, without large motions, either linear or rotational.

Remotely located fuel selector valves must necessarily be operated by linkage between the valve and locations close to the pilot. In operation, various settings of the valves must be able to be selected easily and positively through such linkages without requiring undue force which might impair an accurate indication and feel of the valve position in the operating mechanism controlled by the pilot. The same operational characteristic, of course, is desirable as well when the operating handle or mechanism is connected more directly to the selector valve. The valves, at the same time, must exhibit the desirable features of positive open and closed valve operation and relatively low pressure losses in the fluid flowing through the valve.

It is an object of my invention, therefore, to provide a rotary multi-port selector valve whose operation generally is opposed by relatively low friction forces. It is also an object to provide such a selector valve which operates to push open the valve closures by a force applied in general alignment with the motion imparted to the valve closures. Another object of my invention is to provide such a selector valve which permits a wide choice of closure means. Another object is to provide a selector valve whose mode of operation permits a choice of closure means which produce a relatively low pressure drop across the valved inlets. It is an object to provide a rotary-operated selector valve whose mode of operation permits the use of relatively large spring loads for insuring the positive and effective closing of the valved ports while requiring relatively low torque to open the valved ports. Another object is to provide such a selector valve in which rotation of the operator is aided, at least in part, by the restoring forces tending to seat the valving closures. Another object of my invention is to provide a fuel selector valve of the multi-port type and having a rotary valve operator which produces large linear motions of the valving means for relatively small amounts of angular rotation of the operator. Another object of my invention is to provide a multi-port rotary-operated selector valve having a plurality of radially arranged inlet ports circumferentially closely spaced and in one or more levels or planes and operated by a single operating shaft having ganged valve actuating means. Another object is to provide a fuel selector valve having means for providing a positive and accurate indication of the operative position of the valve. Another object is to provide such valves that can be remotely operated by positive but simple and inexpensive linkage means, such as Bowden wire controls.

These and other objects and advantages of my invention will be apparent from the following description of a preferred and modified form thereof taken together with the accompanying drawings in which.

Figure 1:
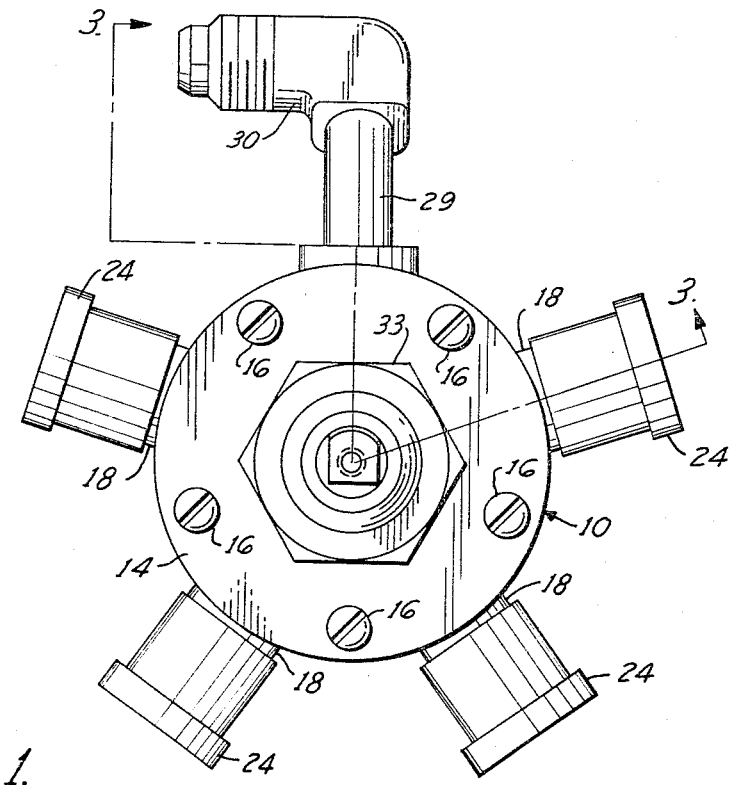
FIGURE 1 is a top plan view of one form of valve embodying my invention.

Briefly, my invention comprehends a selector valve having a housing provided with a plurality of circularly arranged and circumferentially spaced ports and an operating stem having its axis at the center of the circle and generally perpendicular thereto. The ports, for example, may comprise a number of inlet ports and a common outlet port opening into a generally cylindrical chamber. The operating stem is mounted for rotation through a wall of the housing. A crank having a wrist pin is mounted on that portion of the stem within the housing. A suitably shaped rotating cam is mounted for rotation on the wrist pin and carried by the crank in a circle about the axis of the valve stem. The entire assembly may be likened to a hypocyclic gear train assembly in which circularly arranged ports correspond to a ring gear with and within which the rotating cam has a gearing relationship so that it is rotated about the wrist pin as it travels about the circumference of the circle defined by the arrangement of ports.

As shown in FIGURES 1 through 4 of the drawings, one embodiment of my invention consists of a valve having a hollow housing indicated generally at 10 and made up of a generally cylindrical side wall 11 closed at one end by a circular end wall 12 and at the other end by a removable circular end wall 14 and a sealing gasket 15 held in place by cap screws 16 turned into tapped bores in an annular mounting flange 17 secured to side wall 11. Side wall 11 and end walls 12 and 14 thus comprise a housing having a generally cylindrical interior chamber.

Figure 4:
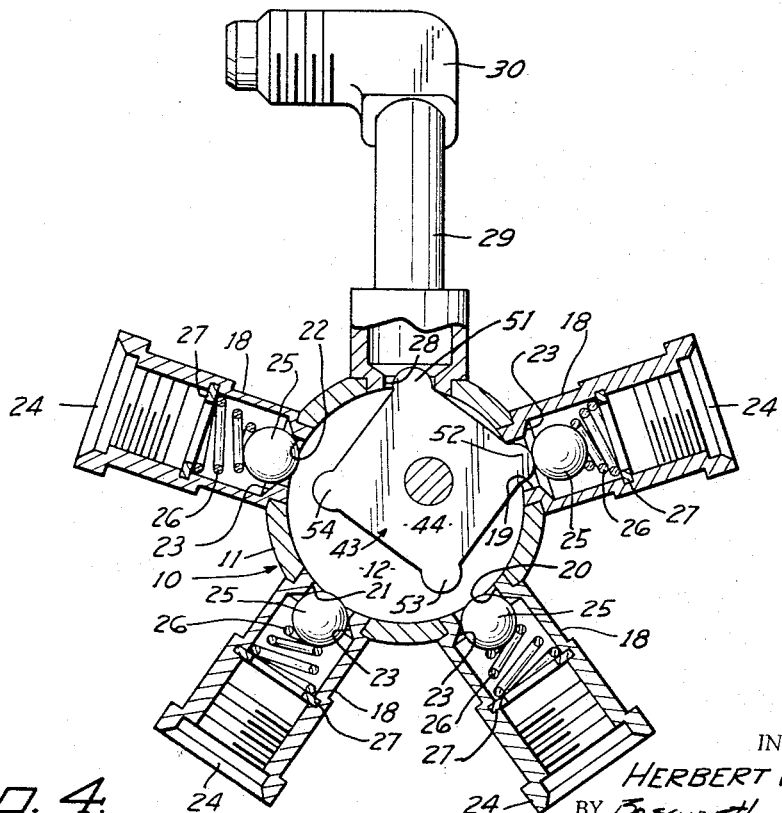
FIGURE 4 is a sectional plan view taken along line 4—4 of FIGURE 2.
Figure 5:
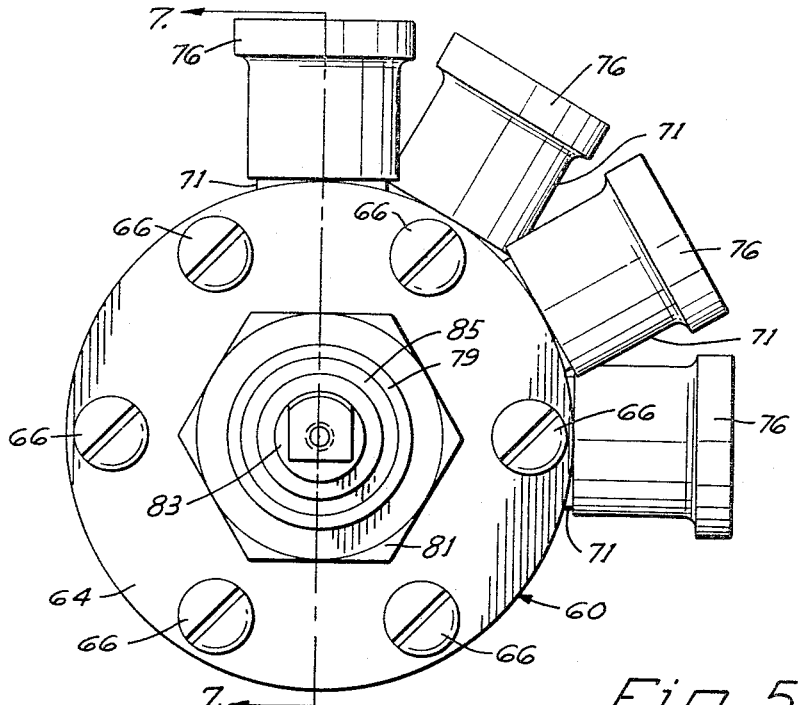
FIGURE 5 is a top plan view of another form of valve embodying my invention.
Figure 6:
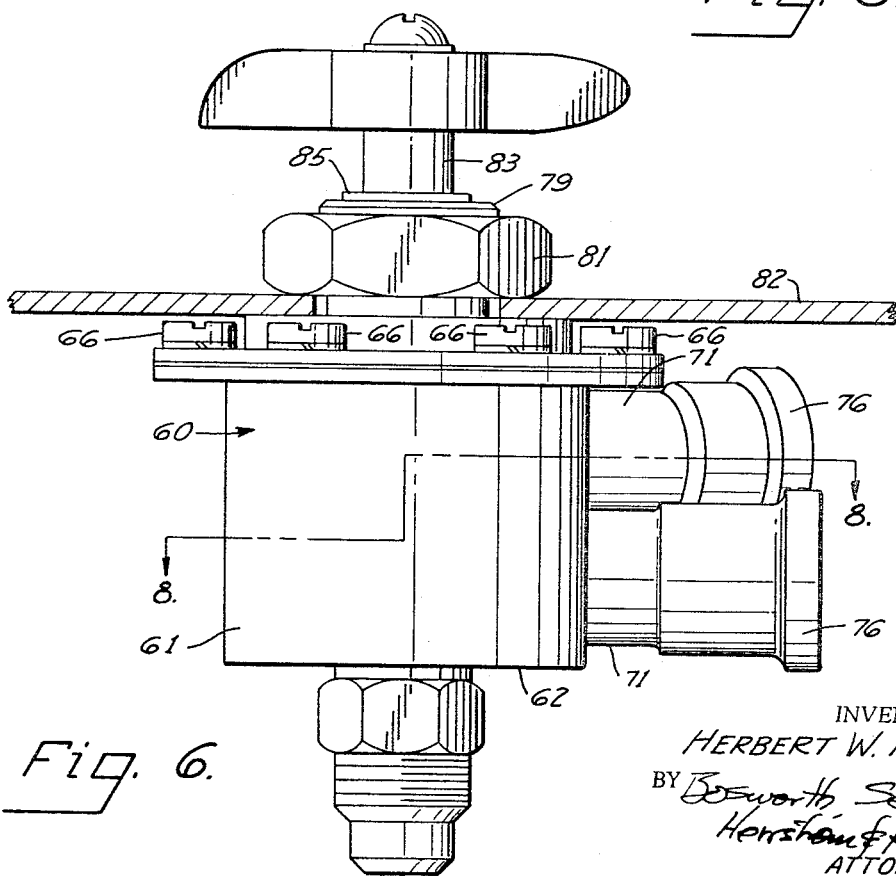
FIGURE 6 is a side elevation view of the valve shown in FIGURE 5.

As seen most clearly in FIGURE 4, side wall 11 is provided with a circular arrangement of openings and inlet conduits 18 secured therein and forming inlet ports 19, 20, 21 and 22 opening into the interior chamber of housing 10. In the valve shown in the drawings, these inlet ports are identical and are given different reference numerals in this description only to facilitate the explanation below of the operation of the valve. The radially inward end of each conduit 18 has a reduced bore and a reduced outside diameter, the latter being terminated by an annular radial shoulder. The reduced outside diameter permits the inward end of each inlet conduit 18 to be inserted in its associated opening in side wall 11 to the extent permitted by the radial annular shoulder. Each inlet conduit 18 is attached to side wall 11 in an appropriate manner, such as by brazing. The reduced bore at the inward end of each inlet conduit 18 comprises its respective inlet port and valve seat 23 therein. The outward portion of each inlet conduit 18 is provided with a connection socket 24 or other suitable means for providing a connection with fluid conducting lines leading to various fuel tanks, for example.

Included within each inlet conduit 18 and between valve seat 23 and socket 24 is a valve closure member or ball 25. Ball 25 is of greater diameter than valve seat 23 and constitutes an outwardly opening valve closure member. Each ball closure member 25 is biased radially inwardly by a helical compression spring 26 acting between its associated ball 25 and an internal annular shoulder in the bore of conduit 22 such as snap ring 27.

Housing 10 is also provided with a common outlet port 28 located in side wall 11 in communication with an outlet conduit 29. As shown in the drawings, outlet port 28 has no valving means. A connection means, such as nipple 30, is provided for placing outlet port 28 in communication with a fluid conducting line, such as the fuel line, to an internal combustion engine. It will be understood, of course, that outlet port 28 may be located other than in side wall 11 of housing 10 and constitutes a common outlet for the fuel delivered to the interior chamber of the housing through one or more of the inlet ports.

Removable end wall 14 is provided with a raised boss 31 on its exterior face. A bore 32 extends completely through boss 31 and end wall 14. When removable end wall 14 is secured in place, closing one end of housing 10, bore 32 is directed to the center of the circular arrangement of inlet ports 19, 20, 21 and 22 in cylindrical side wall 11.

Figure 2:
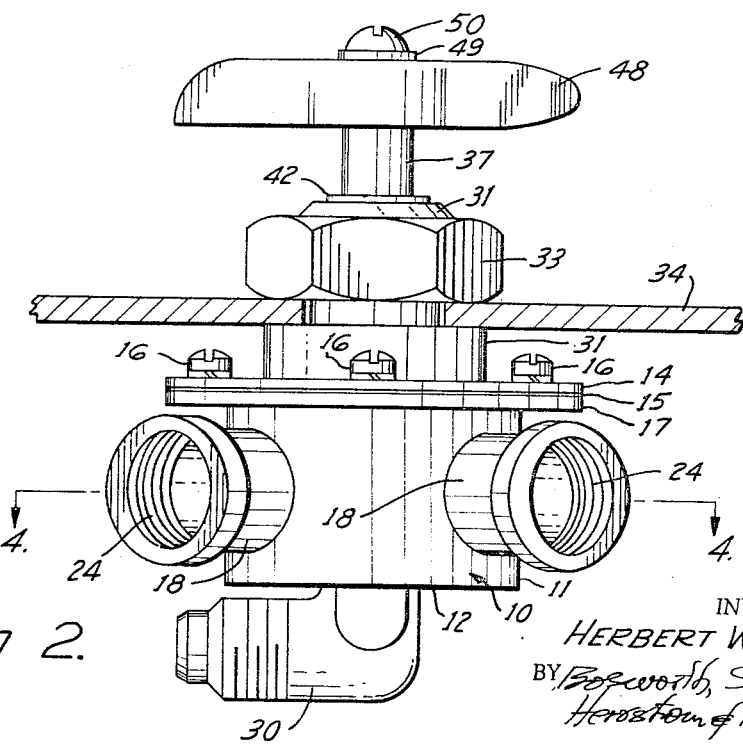
FIGURE 2 is a side elevation view of the valve shown in FIGURE 1.
Figure 3:
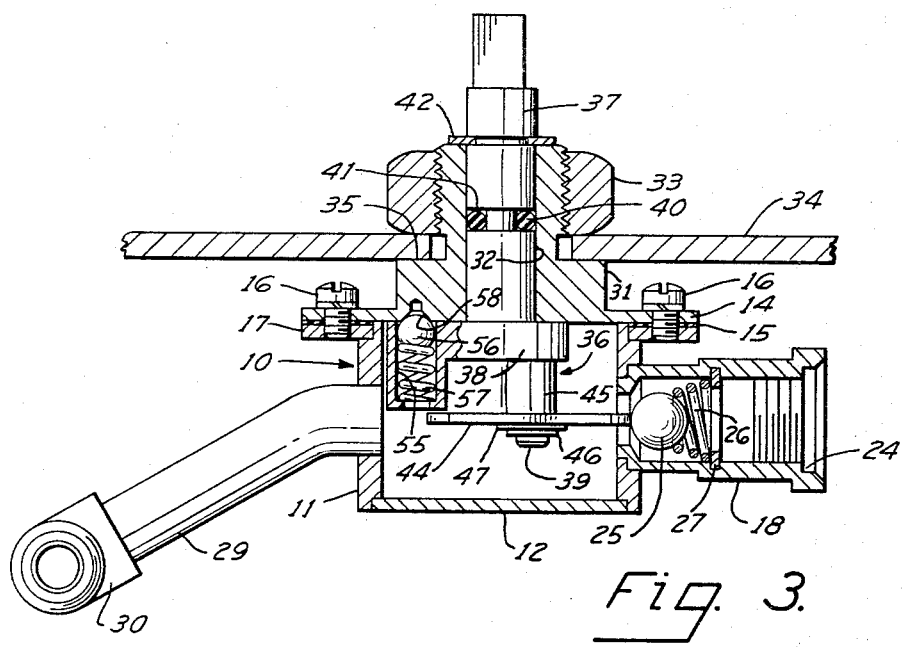
FIGURE 3 is a partial axial cross section through one of the inlet ports and along line 3—3 of FIGURE 1.

The outward end of boss 31 has a threaded portion of reduced diameter for receiving a jam nut 33 or the like. Jam nut 33 permits mounting and fastening the selector valve to a wall or flange 34 as shown in FIGURES 2 and 3 by inserting the reduced threaded portion of boss 31 through a hole of approximately the same size and turning jam nut 33 onto the reduced threaded portion on the opposite side of the flange 34. Thus, flange 34 is clamped tightly between shoulder 35 of boss 31 and jam nut 33.

The means for operating the selector valve comprises a crankshaft assembly indicated generally at 36 which includes crankshaft portion 37, a crank 38 and a crankpin 39. Crankshaft 37 is journaled for rotation in bore 32 of boss 31. A seal, such as O-ring 40 received in groove 41 of the shaft, prevents fluid in the chamber from passing out around shaft 37. Crank 38 and crankpin 39 carried thereon lie within housing 10 while the free end of crankshaft 37 extends outwardly beyond the extent of boss 31. Crankshaft 37 is held in place by means of a snap ring 42 received in an appropriate groove in the shaft at the point of its extension from boss 31. Thus, snap ring 42 and crank portion 38 cooperate to prevent axial motion while permitting rotation of crankshaft 37.

Journaled on crankpin 39 is a rotatable cam, indicated generally at 43, having a relatively thin, flat-shaped portion 44 lying in a plane perpendicular to the axis of crankpin 39 and a bearing portion 45 of suitable axial extent. Bearing part 45 provides for the wobble-free rotation of cam 43 on crankpin 39 and bears against a flat surface on crank portion 38. Cam 43 is held in place on crankpin 39 by means of a snap ring 46 and underlying washer 47.

The end of main shaft 37 located outside housing 10 and beyond the end of the reduced threaded portion of boss 31 is provided with off-center flats for receiving and maintaining driving engagement with an operating handle 48 such as shown in FIGURE 2. Handle 48 may be held in place in any suitable manner such as by washer 49 and screw 50 turned into a tapped bore in the end of main shaft 37.

As seen in FIGURE 4, the relatively thin, flat-shaped portion of cam 43 has a substantially square outline modified by an approximately semicircular enlargement at each corner. Each of the enlarged rounded corners constitutes an operating lobe of the cam and is identified in FIGURE 4 as lobes 51, 52, 53 and 54. While all of these lobes are the same and are symmetrically located with respect to each other and the axis of crankpin 39 about which they revolve, they have been given individual reference numbers to facilitate the description of the operation of the valve.

It will be apparent from the foregoing description that main shaft 37 of crankshaft 36 is free to rotate in bore 32 of boss 31 and is maintained against axial displacement by bearing engagement of crank portion 38 with the interior side of end wall 14 and the bearing engagement of snap ring 42 with the outward end of boss 31. As main shaft 37 is rotated, crankpin 39 carried on crank portion 38 revolves within housing 10 about the center of the circular arrangement of inlet ports 19, 20, 21 and 22. As crankpin 39 revolves, the operating lobes of cam 43 successively enter, engage and withdraw from the circular arrangement of inlet ports 19, 20, 21 and 22 in much the same manner as a planet gear engages and rides around a ring gear.

Crankshaft assembly 36 is preferably provided with means to releasably position it in any one of a number of predetermined angular positions of rotation. In FIGURE 3 is shown a spring-loaded detent carried in crank 38 and comprising a bore 55 generally axially normal to the inner face of end wall 14 holding a ball detent 56 and a spring 57 urging the detent toward wall 14. The inner face of wall 14 is provided with the desired number of cooperating depressions 58 at predetermined locations for receiving ball detent 56 when positioned opposite it during the rotation of crank 38. While the crank and its ball detent may easily be rotated by these depressions, the dropping of the ball into one of them tends to releasably hold crankshaft assembly from further rotation and provides as well a desirable "feel" of the valve position to the operator of the valve. The cooperating depressions are located to position and indicate the selected condition of the valve as will be apparent from the description of its operation below.

The operation and movement of cam 43 is best seen and described in connection with FIGURE 4. As shown therein, crankshaft 37 is in an angular position so that lobe 51 of the cam 43 reaches into common outlet port 28 and lobe 52 reaches into and through inlet port 19 and into engagement with valve closure ball 25, pushing it away from valve seat 23 against the inward bias of spring 26. In this position of crankshaft 36, inlet port 19 is placed in communication with outlet port 28 through the interior chamber of housing 10 while the valve closures in inlet ports 20, 21 and 22 remain closed.

Since inlet ports 19, 20, 21 and 22 and outlet port 28 are circularly arranged and equally spaced circumferentially from each other a distance approximately equal to the spacing between adjacent ones of the cam lobes, it will be apparent that further rotation in either direction of crankshaft 36 will cause the cam 43 to advance about the circular arrangement of ports in one direction while rotating about crankpin 39 in the opposite direction. For example, rotation of crankshaft 36 in a clockwise direction will rotate the cam in a counterclockwise direction so that lobe 51 is withdrawn from outlet port 28, lobe 52 remains in valve-opening engagement in inlet port 19 and lobe 53 is moved substantially radially of housing 10 into valve-opening engagement in inlet port 20. As the rotation of crankshaft assembly 36 is continued in a clockwise direction until the axis of the crankshaft is about midway between the radially directed axes of inlet ports 19 and 20, lobe 52 remains extended into inlet port 19 and in valve-opening engagement with the ball closure holding it against its spring and away from its valve seat. At the same time, lobe 53 of the cam is moved substantially radially of housing 10 in and through inlet port 20 into valve-opening engagement with its ball closure holding it away from its valve seat. Thus, at this angular position of rotation of crankshaft assembly 36, the valve closure balls 25 associated with inlet ports 19 and 20 are both engaged by a lobe of cam 43 and are held away from their respective valve seats 23 so that both inlet ports 19 and 20 are placed in communication with outlet port 28 through housing 10.

Further clockwise rotation of crankshaft assembly 36 to a point where the axis of crank 38 is aligned with the radially directed axis of inlet port 20 withdraws lobe 52 from inlet port 19 and out of engagement with its ball closure, permitting it to be seated against its valve seat by its spring and close inlet port 19. Lobe 53, during this rotation, continues to reach into inlet port 20 and remains in valve-opening engagement with the ball closure therein and even extends a slightly greater distance radially of housing 10 through inlet port 20, displacing the ball closure therein a slight distance further away from its valve seat. At this angular position of rotation of crankshaft assembly 36, only inlet port 20 is placed in communication with outlet port 28 through the interior chamber of housing 10 and the inlet balls 25 in inlet ports 19, 21 and 22 are seated by their springs 26 against their valve seats 23, closing their respective inlet ports.

From the foregoing, it will be apparent that further rotation in either direction will produce the successive opening and closing of adjacent inlet ports in the circular arrangement shown in the drawings. Further, at particular positions of angular rotation of crankshaft assembly 36, any two adjacent inlet ports can be opened simultaneously. Also, all inlet ports can be closed by rotating crankshaft assembly 36 so that none of the lobes of cam 43 are in valve-opening engagement with any of the valve closure balls 25 in the inlet ports. In this position, one of the lobes of plate-like cam 44 extends radially into outlet port 28 and crank 38 is in substantial alignment with the axis of the outlet port.

Any number of inlet ports may be accommodated by this type of operation, it being necessary only that the plate-like cam have a number of lobes at least one less than the number of circumferentially spaced ports, both inlet and outlet, to provide the gearing relationship described above and that the reach of the closure-engaging portion of the lobes beyond the circular path of travel of the axis of the cam be sufficient to open the valve closures upon engagement therewith. In order to permit more than 360° of rotation of the crankshaft assembly, the circumferential spacing of the ports and the spacing between adjacent lobes of the cam must all be equal.

My invention comprehends, however, other than equal spacings between the ports and corresponding spacings between the cam lobes as when the ports may all enter the housing spread throughout less than 360° of its circumference. Such an arrangement is shown in the valve of FIGURES 5 through 8 described below. Even in such a case, continuous rotation in excess of 360° may be provided by using capped or dummy openings at appropriate points in the housing circumference to receive the cam lobes as the crankshaft assembly is moved through a complete revolution. In such a case, the operation of the valve is as described above except that no valving is performed by cams entering and leaving the capped openings. The particular arrangement of active ports and/or dummy ports will depend upon the functional connections and operations required of a particular valve.

Because cam 43 rotates about an axis offset from the axis of rotation of crankshaft 36, the engagement and disengagement of the lobes of the cam with the valve closure members is accomplished without any substantial sliding friction. The closure-engaging portion on each lobe of cam 43 enters and departs a particular inlet port and engages and pushes the ball closure member 25 away from its seat 23 along a path that is substantially linear and radially of the housing 10. This particular feature of the motion of the valve-opening cam permits the use of a wide variety of valve closures other than balls 25 shown and described herein and my invention comprehends the use of other valve closure members than balls, such as axially guided discs, cones or other suitable shapes. I have found a ball closure to have especial advantage when used in the valve of my invention. Its spherical character permits it to make effective sealing engagement with a circular valve seat irrespective of the orientation of the ball. This, together with the long reach of the valve-engaging portions of the operating cam through and beyond the valve seat, results in a long excursion of the closure from the seat which tends to minimize the pressure drop across the valve seat and its inlet port when open. The ball need not be constrained to move only axially of the inlet conduit when unseated and, in fact, may be pushed to one side of the conduit axis. This permissible freedom of movement allows the bore of the conduit to be made relatively much larger than the ball diameter, materially decreasing the pressure drop produced across the open port. A further advantage of the hypocyclic motion of the closure-engaging portions of the cam lobes before, after and during engagement with the valve closure member is that the spring tending to close the valve closure ball in one inlet port pushes the lobe of the cam engaging it so as to aid the rotation of the lobed cam as the next lobe enters and begins to open the next adjacent inlet port.

It is important to note that the actuation of the valve closure members by the lobed cam is accomplished without any substantial sliding friction between the cam lobes and that portion of the valve closures engaged by them. This desirable benefit results from the gearing action of the lobed cam with respect to the circularly arranged ports and their associated valve seats and valve closures.

The necessary geometrical relationships in rotary selector valves comprehended by my invention are both hypocycloidal and hypotrochoidal in nature. For example, the ports in the internal chamber of the valve are all equidistant from the chamber axis and thus lie and are circumferentially spaced along an imaginary circle having the chamber axis as its center. The cam mounted for rotation about an axis which is parallel to the chamber axis and which revolves about the chamber axis comprises a theoretical circle having the cam axis of rotation as its center and which has theoretical rolling engagement within the circle on which the ports lie. Thus, a point on this theroetical circle of the cam traces a hypocycloid as the cam axis revolves about the chamber axis.

Since the cam lobes project radially outwardly and beyond the theoretical circle of the cam mentioned above, the lobes, and particularly the valve closure-engaging portions of them, follow a hypotrochoidal path with respect to the imaginary circle upon which the ports lie. This means that the valve closure-engaging portions of the cam lobes successively cross and recross the imaginary circle of ports in a well-known geometrical relationship. The imaginary circle of ports is crossed by the valve-engaging portion of each cam lobe as it moves radially outwardly substantially along an extension of a radius of the imaginary circle. The recross follows a path almost the same as the crossing path and is also approximately along an extension of a radius of the imaginary circle.

From this analysis of the geometry of the operation of rotary selector valves comprehended by my invention, it will be apparent that the valve-engaging portions of the cams engage and move the valve closure members by a force applied thereto that is directed in approximately a straight line along an extension of a radius of an imaginary circle of ports. It will be noted further that rotation is imparted to the lobed cam by its engagement with the sides of the ports at a point radially inwardly of the valve closure members, the points of engagement of the cam with the sides of the ports following approximately a hypocycloidal path.

Another embodiment of my invention is shown in FIGURES 5 through 8. The valve has a housing indicated generally at 60 made up of a cylindrical side wall 61, a circular end wall 62 attached to one end thereof and a removable circular end wall 64 closing the other end of the housing. End wall 64 is held in place and sealed by a gasket 65 and cap screws 66 turned into tapped bores in an annular flange 67 attached to cylindrical side wall 61.

The hollow housing 60 is provided with a number of ports or apertures, including inlet ports 69 and an outlet port 70, opening into the lower end wall 62. An inlet conduit 71 is provided for each inlet port 69. As the valve is shown in FIGURES 5 through 8, each inlet conduit 71 is fixedly attached into side wall 61 as by brazing and its end that is radially inward of the valve forms the inlet port 69. Each inlet conduit 71 serves also to house and provide an outwardly opening, inwardly biased valve means similar to that disclosed in the valve shown in FIGURES 1 through 4.

In each inlet conduit 71, the valve means comprises a valve seat 72, a ball closure member 73 and a spring 74 acting between an internal snap ring 75 and ball closure 73 so as to urge the ball into sealing engagement with valve seat 72. The radially outward end of each inlet conduit 71 is provided with a connection nipple 76 for attaching fluid-conducting lines.

As shown in the drawings, outlet port 70 is provided with an outlet conduit 77 having means for connecting a fluid conducting line to it. Outlet port 70 contains no valving means.

Figure 7:
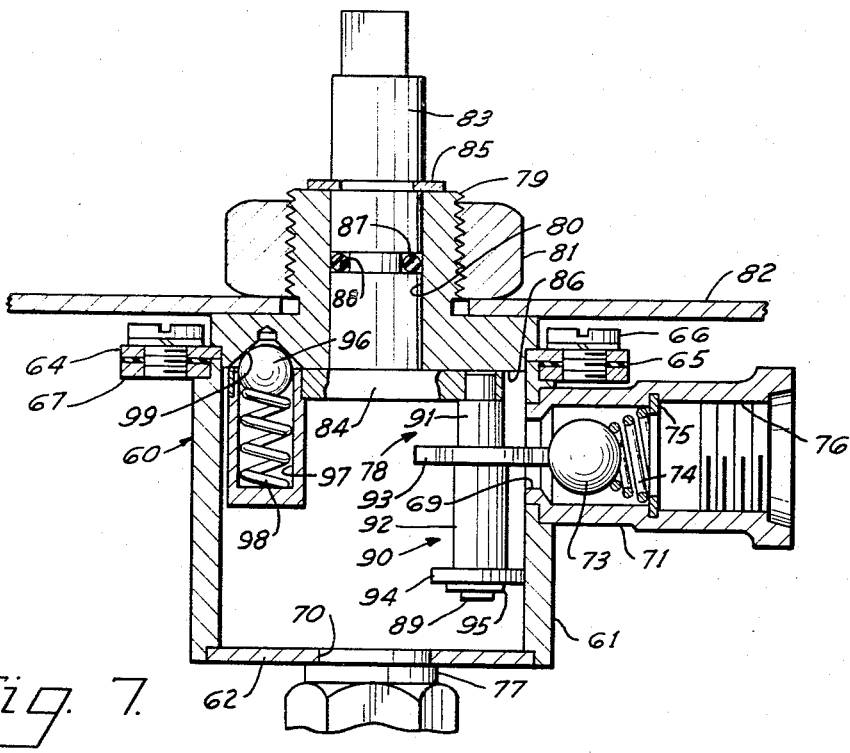
FIGURE 7 is an axial cross section through one of the inlet ports and along line 7—7 of FIGURE 5.
Figure 8:
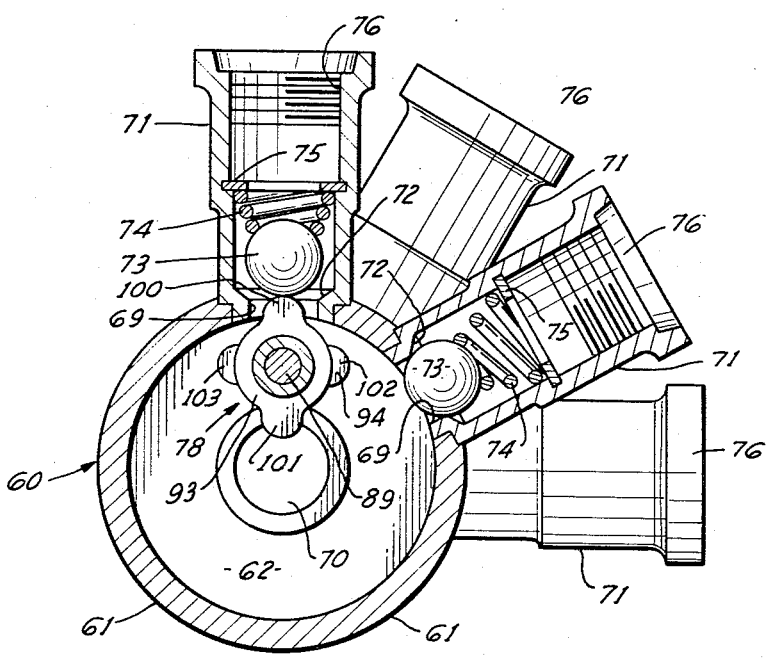
FIGURE 8 is a sectional plan view taken along line 8—8 of FIGURE 6.

As shown in FIGURES 7 and 8, a crankshaft assembly indicated generally at 78 and similar to crankshaft assembly 36 of the valve of FIGURES 1 through 4 is mounted in removable end wall 64 for rotation within housing 60. End wall 64 is provided with an externally threaded exterior boss 79 having a central bore 80 axially aligned with the axis of cylindrical side wall 61. A jam nut 81 is turned onto boss 79 and provides a convenient means for mounting the valve in an appropriate opening in a wall or flange 82.

Crankshaft assembly 78 comprises a crankshaft portion 83 extending from the exterior to the interior of the valve housing and terminating therein in the crank portion 84. Crankshaft 83 is permitted rotational movement within bore 80 and denied any substantial axial movement by the cooperation of a snap ring 85 fitted into an appropriate groove in the external portion of crankshaft 83 and for engagement with the exterior end of boss 79 and crank 84 having sliding engagement with the interior-facing surface 86 of removable end wall 64. A fluid seal 87, carried in an appropriate groove 88 in crankshaft 83, provides a fluid-tight seal against the escape of fluid from the housing.

Crankshaft assembly 78 also comprises a crank pin portion 89 carried in crank 84 and having an axis parallel to and radially offset from the axis of crankshaft 83.

A rotatable cam indicated generally at 90 is mounted for rotation on crank pin 89. Rotatable cam 90 is made up of bearing and spacing sleeve portions 91 and 92 and a pair of thin, flat cam plates 93 and 94. Cam plates 93 and 94 are axially spaced apart along crank pin 89 by sleeve portion 92 and cam plate 93 is spaced from crank 84 by a sleeve portion 91. The entire assembly of sleeve portions 91 and 92 and cam plates 93 and 94 is permitted rotation about crank pin 89 and denied axial movement thereon by a snap ring 95 carried on the free end of crank pin 89 and having bearing engagement with cam plate 94.

Crankshaft 83 is provided with ball detent means comprising a ball detent 96 carried in a bore 97 and biased by a spring 98 for cooperating engagement with appropiately located depressions 99 in the interior face of end wall 64. It will be apparent from the foregoing and the description of similar means in the valve of FIGURES 1 through 4 that when detent 96 is spring urged into one of the depressions 99, the crankshaft assembly 78 will tend to be held in a particular position of rotation corresponding to the engaged depression 99.

The particular valve shown in FIGURES 5 through 8 is characterized by the relatively close angular spacing of the inlet ports and conduits. As clearly shown in FIGURE 8, four inlet conduits are arranged within 90° of the circumference of the housing. Such a grouping of inlet conduits is often advantageous in arranging the fluid lines into and out of the selector valve and normally can be accomplished only by reducing the size of the openings and employing complex manufacturing procedures. Further, in conventional selector valves in which the valve operator and valve closure members have only sliding contact, the precise positioning of the valve operator becomes difficult and is accomplished only with high torque forces through a limited portion of rotation.

The valve disclosed in FIGURES 5 through 8 overcomes these several disadvantages because of the rotatable cam feature it employs which permits the valve closure members to be opened by a force directed generally radially of the housing and with little or no sliding friction between the valve operator and the valve closure member.

The axial, as well as circumferential, spacing between adjacent inlet conduits also permits a greater number of inlet conduits to be accommodated within a given segment of the housing circumference. As will be apparent from FIGURES 7 and 8, each of cam plates 93 and 94 is provided with lobes 100 and 101 and lobes 102 and 103, respectively. Each of the lobes projects beyond a theoretical circle of its cam plates having hypocycloidal rolling engagement within the cylindrical housing so that the valve closure-engaging portion of each of the lobes traces a hypotrochoidal path with respect to the interior surface of the housing.

In operation, the valve shown in FIGURES 5 through 8 employs basically the same principle as does the operation of the valve described in connection with FIGURES 1 through 4. As seen in FIGURE 8, crankshaft assembly 78 is positioned so that lobe 100 of cam plate 93 extends radially of the housing through an inlet port 69 and holds ball closure member 73 out of sealing engagement with its cooperating valve seat.

Rotation of crankshaft assembly 78 approximately 30° in a clockwise direction rotates cam assembly 90 counterclockwise so that cam lobe 102 of cam plate 94 is brought into engagement with and urges radially outward and away from its valve seat the ball closure 73 in the inlet port 69 next adjacent in a clockwise direction to the port previously opened by cam lobe 100. At the same time, cam lobe 100 withdraws from the inlet port into which it last projected, permitting its ball closure to be sealingly seated.

Rotation of crankshaft assembly 78 another 30° in the clockwise direction as seen in FIGURE 8 brings the other lobe 101 of cam plate 93 into engagement with the ball closure in the circumferentially next adjacent inlet port 69, opening it while the port engaged and opened by cam lobe 102 of cam plate 94 is closed as lobe 102 withdraws from it.

Further rotation will bring cam lobe 103 of cam plate 94 into engagement with the ball closure in the next circumferentially adjacent inlet port, opening it while cam lobe 101 of cam plate 93 withdraws from the previously opened inlet port, permitting its ball closure to seat. It will be apparent that by employing axial as well as circumferentially spaced adjacent inlet ports and valve closures and corresponding cam plates and cam lobes that the desirable entering and withdrawing action of the cams in engaging and opening and disengaging and closing the valve closure members is preserved while permitting the close grouping of inlet conduits within a narrow segment of the housing.

The rotatable cam 90, with its two cam plates 93 and 94, may be aptly characterized as a ganged cam. It will be understood, of course, that any desired number of cam plates and corresponding axial levels of inlet conduits may be employed and that the advantage illustrated in the valve of FIGURES 5 through 8 is not limited to a valve having two cam plates and two axial levels of inlet conduits.

Changes, modifications and improvements may be made to the above-described preferred and modified forms of my invention without departing from the precepts and principles of the invention. Therefore, I do not wish my patent to be limited to any particular form of my invention specifically illustrated and described nor in any manner inconsistent with the extent to which my invention has promoted the art.

I claim:
1. A selector valve comprising
    a hollow housing including an interior chamber having an axis,
    a plurality of inlet ports arranged about said chamber axis as a center and entering said chamber at circumferentially spaced intervals,
    an outlet port in said chamber,
    cooperating valve seats and outwardly opening and inwardly biased valve closures in said inlet ports, the radially inward extent of all said valve closures being equidistant from said chamber axis,
    rotary valve actuating means within said chamber and operable from outside said chamber comprising rotating means mounted within said chamber for rotation about its axis and a lobed element carried by said rotating means and mounted thereon for rotation about a revolving axis, said revolving axis being parallel to and revolving about said chamber axis and said lobed element having lobes projecting outwardly from said revolving axis and into gearing engagement with said circumferentially spaced ports so that, upon rotation of said rotating means, a projecting lobe of said lobed element extends and reaches into engagement with the valve closure of a selected one of said inlet ports and pushes said valve closure outwardly and away from its cooperating valve seat and upon further rotation withdraws from rotation with said valve closure permitting it to be biased inwardly into sealing engagement with its cooperating valve seat,
    whereby said selected inlet port is placed into and out of communication with said outlet port through said chamber and the other of said inlet ports remain out of communication with said outlet port.

2. The selector valve of claim 1 in which the lobes of said lobed element project the same distance and in different directions from said revolving axis and said revolving axis moves in a circle of revolution of fixed radius with said chamber axis as a center, the distance of projection of said lobes from said revolving axis and the fixed radius of said revolving axis from said chamber axis being such that the sum and the difference of the distance of projection of said lobes from said revolving axis and the fixed distance of said revolving axis from said chamber axis is greater and lesser, respectively, than the spacing of the radially inward extent of each of said valve closures from said chamber axis.

3. The selector valve of claim 1 in which said lobes of said lobed element engage the sides of said inlet ports upon rotation of said operating means to impart rotational movement to said lobed element.

4. The selector valve of claim 3 in which said outlet port is included in the circumferentially spaced arrangement of said inlet ports about said chamber axis.

5. The selector valve of claim 1 in which the valve closure-engaging portion of each of said lobes on said lobed element follows a generally hypotrochoidal path with respect to a circle passing through the radial inward extent of each of said valve closures and having said chamber axis as a center.

6. The selector valve of claim 1 in which adjacent ones of said inlet ports and said lobes of said lobed element are spaced axially and circumferentially from each other with respect to said chamber axis.

7. A rotary selector valve comprising
    a valve body having a cylindrically-walled interior chamber ported at circumferentially spaced intervals and having an axis,
    a cooperating valve seat and outwardly opening, inwardly biased valve closure in flow-controlling relationship with at least one of said ports,
    revolving means having a cam axis and mounted for revolution and movement in said interior chamber carrying said cam axis parallel to and in a circular path of revolution about the axis of said interior chamber,
    a multi-lobed cam mounted for rotation on said cam axis, said cam having gearing engagement with said ported wall and valve-opening pushing engagement with each of said valve closures encountered in said ports.

8. The selector valve of claim 7 in which at least two adjacent ports are provided with cooperating valve seats and valve closures and circumferentially adjacent lobes of said cam have sufficient radial reach to have simultaneous valve-opening engagement with said valve closures of adjacent ones of said circumferentially spaced ports in said side wall with one of said simultaneously-opened valve closures opening while the other is closing during a portion of a revolution of said cam axis about said chamber axis.

9. The selector valve of claim 7 in which the valve closure-engaging portion of each of said cam lobes approaches, pushes, releases and departs from each of said valve closures along a path substantially radial of said interior chamber during the rotating and revolving movement of said cam.

10. The selector valve of claim 7 in which said ports are circumferentially equally spaced from each other about at least a portion of the circumference of said chamber and said lobes.

11. The selector valve of claim 7 in which said cam comprises
    a theoretical circle of lesser diameter than said interior chamber having rolling engagement with said wall of said chamber as the axis of rotation of said cam revolves about the chamber axis, and lobes extending radially beyond and circumferentially spaced along said theoretical circle of rolling engagement at intervals corresponding to the circumferential intervals between said ports for hypocycloidal gearing engagement with said ported wall and hypotrochoidal valve-opening pushing engagement with each of said valve closures encountered in said ports.

12. A selector valve comprising
    a hollow housing having an interior chamber having an axis,
    a plurality of inlet ports arranged about said chamber axis as a center and entering said chamber at circumferentially spaced intervals,
    an outlet port in said chamber,
    cooperating valve seats and outwardly opening and inwardly biased valve closures in said inlet ports, the radially inward extent of each of said valve closures being equidistant from said chamber axis,
    an operating crankshaft assembly comprising a crankshaft extending from the exterior of and through said body in said interior chamber in coaxial alignment with and supported for rotation about the axis of said chamber, a crank connected to that portion of said crankshaft extending within said interior housing, and a crank pin carried by said crank with the crank pin axis parallel to and offset from the axis of said crankshaft.

a lobed cam mounted for rotation on said crank pin and for hypocycloidal gearing engagement of the lobes with said circumferentially spaced ports in said wall upon rotation of said crankshaft assembly, said cam lobes being at least one less in number than the total of said circularly arranged ports and spaced for gearing engagement with said ports and having sufficient reach from the axis of said crank pin to extend into and outwardly through successive ones of said ports and to engage and push each of said valve closures normally closing said inlet ports off their associated valve seats as said crank and crank pin are rotated toward and to a position radially opposite each of them.

References Cited

UNITED STATES PATENTS

| | | | |
|---|---|---|---|
| 763,827 | 6/1904 | Williamson | 137—630 |
| 2,164,232 | 6/1939 | Downey | 137—630 |

WILLIAM F. O'DEA, *Primary Examiner.*

MARTIN P. SCHWADRON, *Examiner.*

D. R. MATTHEWS, *Assistant Examiners.*